Z. C. ROBBINS.
Churn.
No. 7,006.
Patented Jan'y 8, 1850.
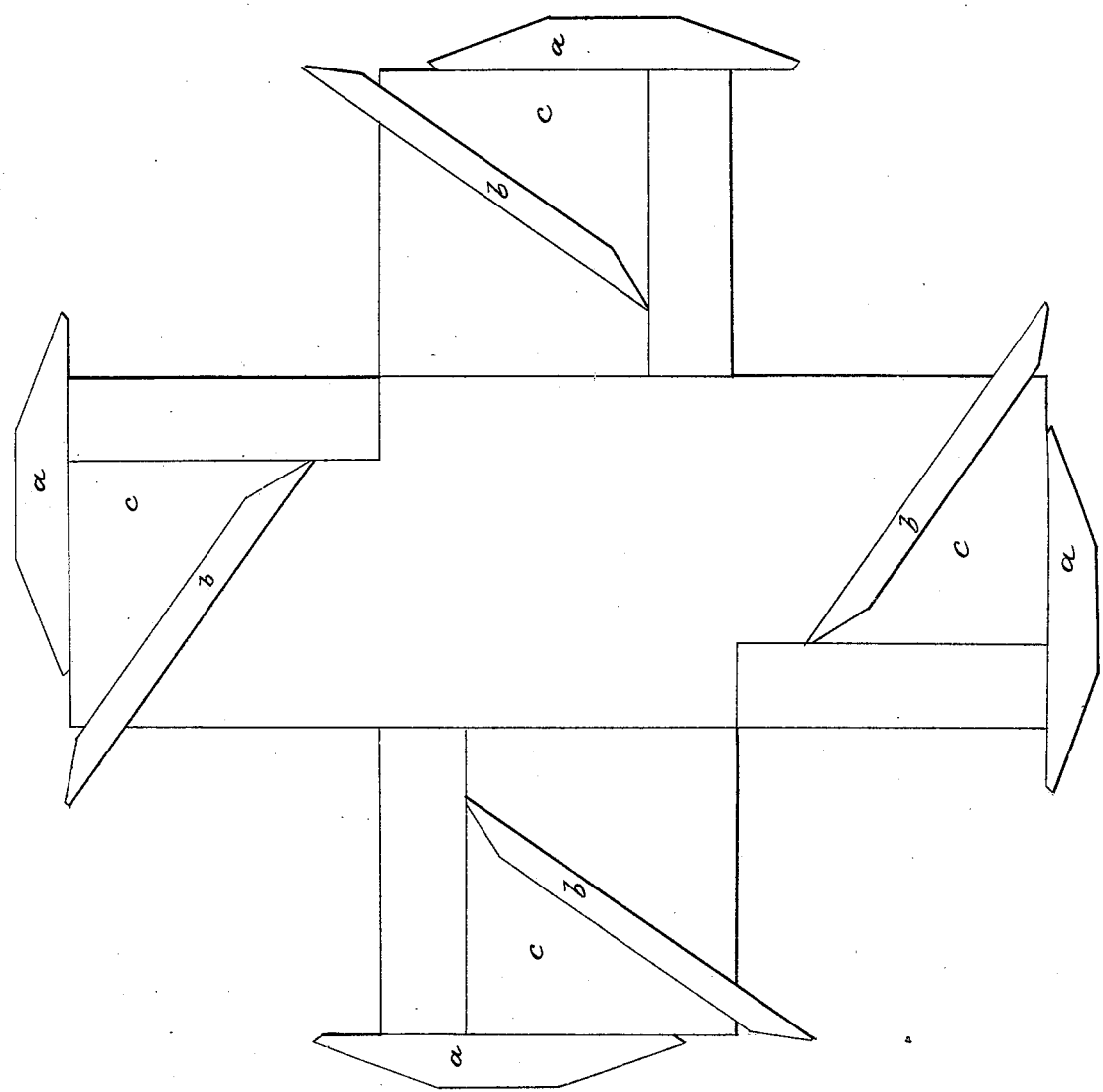

UNITED STATES PATENT OFFICE.

Z. C. ROBBINS, OF ST. LOUIS, MISSOURI.

CHURN.

Specification of Letters Patent No. 7,006, dated January 8, 1850.

*To all whom it may concern:*

Be it known that I, Z. C. ROBBINS, of the city and county of St. Louis, in the State of Missouri, have invented a new and Improved Churn-Dasher, which I denominate the "Centrifugal and Centripital Churn-Dasher"; and I do hereby declare the following to be a full and exact description thereof, reference being had to the accompanying drawing, making a part of this specification.

The centrifugal and centripetal churn dasher is constructed of a series of broad beating blades *a*, *b*, confined at each end to arms *c c*, (or disks,) which form the ends of the dasher. The outer blades, *a*, *a*, which are secured to the extremities of the arms, have their inner flat surfaces placed at right angles—or nearly so—to the radii of the dasher. The series of inner blades *b*, *b*, have their outer edges placed on a line with the outer circle of motion of the dasher, a short distance in the rear of the after edges of the outer blades, and from thence pass obliquely forward under the inner surfaces of the outer blades, and at a considerable divergence therefrom. When the dasher is rotated in cream, the cream will be gathered between the diverging surfaces of each pair of blades, and by the joint action of pressure and suction, be forced therefrom through the narrow space between their after edges; thereby producing the most efficient action upon the cream for the production of butter, that can possibly be effected. As soon as the butter begins to separate itself from the cream, the motion of the dasher must be reversed; when the rear surfaces of the series of inclined inner blades, *b*, *b*, will gather all the butter as fast as it is formed into a roll in the center of the dasher; thereby preventing the clogging and obstruction to the free movement of the dasher by the accumulation of butter about it, (which occurs in all other churns,) and enables the churning operation to be continued until every particle of butter is separated from the cream and gathered into a roll.

With all other churns, I believe the churning operation is discontinued before the cream has parted with all the butter it contains, in consequence of the clogging of the movements of the dasher by the accumulation of butter about it.

When the dasher is but partially immersed in cream, quantities of the cream will be carried above the surface thereof between each pair of blades, and be discharged therefrom in thin curved sheets into the atmosphere in the upper portion of the churn box, thus preventing, by the peculiar position and arrangement of the dasher blades, any portion of the cream from flying off tangentially; and thereby enabling the dasher to be operated in an uncovered box—if desired—to give the cream the full benefit of atmospheric influence. The peculiar position of the dasher blades causing them to pass edgewise through the cream, prevents their putting the whole mass of it, into a rotary motion; in consequence of which absence of rotary motion in the body of the cream, the efficiency of the churning action of the dasher blades is greatly increased, and the dasher can be operated with equal advantage in either a round or a square vessel.

This form of churn dasher it is believed, has the largest amount of effective agitating surface that can possibly be given to it, consistently with the preservation of such a degree of simplicity of form and arrangement of parts as will allow of free access to all the surfaces thereof that are brought in contact with cream, for the purpose of cleansing them. Without which last qualification, no churn will receive favor with dairy-women.

The centrifugal and centripetal churn dasher is equally well adapted to the churning of milk as it is to the churning of cream.

After repeated experiments, it is believed by the inventor that the centrifugal and centripetal churn dasher will produce butter from cream or milk in less time, and with a less expenditure of power, than it can be accomplished by the use of any other churn that has ever been patented or brought into use, and also, that a larger quantity of butter will be produced by the use of the centrifugal and centripetal churn from a given quantity of cream or milk.

Having thus fully described my centrifugal and centripetal churn dasher, what I claim therein as my invention and desire to secure by Letters Patent, is—

The placing the inner surfaces of the series of outer blades *a*, *a*, in positions tangential—or nearly so—to their circle of rotation, when they are combined with the inclined inner series of blades $b$, $b$, substantially in the manner and for the purpose as herein set forth.

Not intending however, to limit myself to the exact number, proportions, positions, and arrangement of the dasher blades as herein described and represented, but shall vary them to suit the different sizes of churns required for operating upon milk, and for operating upon cream, while I attain the same results by means substantially the same as those herein particularly set forth.

Z. C. ROBBINS.

Witnesses:
ROBERT KITTLE,
R. W. WILCOX.